(12) United States Patent
Noh et al.

(10) Patent No.: US 10,028,228 B2
(45) Date of Patent: Jul. 17, 2018

(54) METHOD FOR TRANSMITTING AND RECEIVING FOR POWER CONTROL FACTOR RELATED TO CONSIDERING SELF-INTERFERENCE CANCELLATION IN WIRELESS COMMUNICATION SYSTEM USING FDR MODE AND DEVICES THEREFOR

(71) Applicant: LG ELECTRONICS INC., Seoul (KR)

(72) Inventors: Kwangseok Noh, Seoul (KR); Dongkyu Kim, Seoul (KR); Hyunsoo Ko, Seoul (KR); Sangrim Lee, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 96 days.

(21) Appl. No.: 15/230,303

(22) Filed: Aug. 5, 2016

(65) Prior Publication Data

US 2017/0041121 A1  Feb. 9, 2017

Related U.S. Application Data

(60) Provisional application No. 62/202,179, filed on Aug. 7, 2015.

(51) Int. Cl.
*H04L 5/14* (2006.01)
*H04W 52/14* (2009.01)
(Continued)

(52) U.S. Cl.
CPC ....... *H04W 52/146* (2013.01); *H04W 52/243* (2013.01); *H04W 52/325* (2013.01); *H04W 52/362* (2013.01)

(58) Field of Classification Search
CPC ....... H04L 5/14; H04L 5/0007; H04L 5/0062; H04L 5/1423; H04L 5/0073; H04L 5/005;
(Continued)

(56) References Cited

U.S. PATENT DOCUMENTS 9,282,560 B2 * 3/2016 Negus .................. H04W 84/12
9,673,854 B2 * 6/2017 Choi ...................... H04B 1/525
(Continued)

OTHER PUBLICATIONS

Bharadia et al. "Full Duplex Radios" SIGCOMM '13 Proceedings of the ACM SIGCOMM 2013 conference on SIGCOMM, pp. 375-386 Jun. 13, 2008 (Year: 2008).*

*Primary Examiner* — Wutchung Chu
(74) *Attorney, Agent, or Firm* — Lee, Hong Degerman, Kang & Waimey

(57) ABSTRACT

A method of transmitting a power control factor by a device performing self-interference cancellation (SIC) in a wireless communication system using full-duplex radio (FDR) according to the present invention includes: transmitting, to a user equipment (UE), a first indicator indicating a power control for purpose of reducing an order to be considered as nonlinear components of a self-interference signal; and receiving, from the UE, a second indicator indicating whether the power control for the purpose of reducing the order to be considered as the nonlinear components of the self-interference signal is accepted or not in response to the first indicator.

13 Claims, 4 Drawing Sheets

(51) Int. Cl.
*H04W 52/32* (2009.01)
*H04W 52/24* (2009.01)
*H04W 52/36* (2009.01)

(58) Field of Classification Search
CPC ...... H04B 1/525; H04B 17/345; H04B 15/02; H04W 52/243; H04W 72/082; H04W 52/241; H04W 72/0406; H04W 52/245; H04W 52/146; H04W 52/325; H04W 72/042; H04W 72/0473; H04W 52/362
See application file for complete search history.

(56) References Cited

U.S. PATENT DOCUMENTS

| | | | |
|---|---|---|---|
| 9,698,861 B2* | 7/2017 | Braithwaite | H04B 1/525 |
| 2015/0003370 A1* | 1/2015 | Yokomakura | H04W 52/24 |
| | | | 370/329 |
| 2015/0029981 A1* | 1/2015 | Takahashi | H04W 74/08 |
| | | | 370/329 |
| 2015/0156003 A1* | 6/2015 | Khandani | H04L 5/143 |
| | | | 370/278 |
| 2015/0296413 A1* | 10/2015 | Sadek | H04B 1/1027 |
| | | | 375/348 |
| 2016/0013831 A1* | 1/2016 | Lea | H01Q 21/24 |
| | | | 455/562.1 |
| 2016/0249302 A1* | 8/2016 | Uchiyama | H04J 11/0056 |
| 2016/0278095 A1* | 9/2016 | Fodor | H04W 76/14 |

* cited by examiner

METHOD FOR TRANSMITTING AND RECEIVING FOR POWER CONTROL FACTOR RELATED TO CONSIDERING SELF-INTERFERENCE CANCELLATION IN WIRELESS COMMUNICATION SYSTEM USING FDR MODE AND DEVICES THEREFOR

CROSS-REFERENCE TO RELATED APPLICATIONS

Pursuant to 35 U.S.C. § 119(e), this application claims the benefit of U.S. Provisional Application No. 62/202,179, filed on Aug. 7, 2015, the contents of which are hereby incorporated by reference herein in its entirety.

BACKGROUND OF THE INVENTION

Field of the Invention

The present invention relates to wireless communication and, more specifically, to transmission and reception of a power control factor considering self-interference cancellation in a wireless communication system using FDR and devices therefor.

Discussion of the Related Art

Full-duplex communication is technology through which one node simultaneously performs transmission and reception so as to improve system capacity to theoretically twice that of half-duplex communication that divides time resources or frequency resources such that the resources are orthogonal and uses the divided resources.

FIG. 1 illustrates the concept of a UE and an eNB which support full-duplex radio (FDR).

In an FDR situation as illustrated in FIG. 1, the following three types of interference are present.

Intra-device self-interference: A signal transmitted by a device as well as a desired signal are simultaneously received since transmission and reception are performed using the same time and frequency resources. Here, since the transmitted signal is received through a reception antenna of the device with almost no attenuation, the transmitted signal is received with considerably higher power than the desired signal and thus acts as interference.

UE-to-UE inter-link interference: An uplink signal transmitted by a UE is received by a neighbor UE and acts as interference.

BS-to-BS inter-link interference: Signals transmitted between BSs or heterogeneous BSs (picocell, femtocell and relay node) in HetNet are received through reception antennas of other BSs and act as interference.

From among the three types of interference, intra-device self-interference (referred to hereinafter as self-interference (SI)) is generated only in an FDR system and remarkably deteriorates the performance of the FDR system, and thus SI is a problem that must first be overcome to operate the FDR system.

SUMMARY OF THE INVENTION

An object of the present invention is to provide a method of transmitting a power control factor by a device that performs self-interference cancellation (SIC) in a wireless communication system using FDR.

Another object of the present invention is to provide a method of receiving a power control factor by a UE from a device that performs SIC in a wireless communication system using FDR.

Yet another object of the present invention is to provide a device that performs SIC and transmits a power control factor in a wireless communication system using FDR.

Still another object of the present invention is to provide a UE for receiving a power control factor from a device that performs SIC in a wireless communication system using FDR.

It will be appreciated by persons skilled in the art that the objects that could be achieved with the present invention are not limited to what has been particularly described hereinabove and the above and other objects that the present invention could achieve will be more clearly understood from the following detailed description.

According to an aspect of the present invention, there is provided a method of transmitting a power control factor by a device performing self-interference cancellation (SIC) in a wireless communication system using full-duplex radio (FDR) scheme, including: transmitting, to a UE, a first indicator indicating a power control for purpose of reducing an order to be considered as nonlinear components of a self-interference signal; and receiving, from, the UE, a second indicator indicating whether the power control for the purpose of reducing the order to be considered as the nonlinear components of the self-interference signal is accepted or not in response to the first indicator.

The method may further include transmitting, to the UE, an uplink power adjustment value to be applied to an uplink transmission of the UE according to the power control for the purpose of reducing the order to be considered as the nonlinear component orders. The uplink power adjustment value may indicate that the UE needs to increases an uplink transmission power value. The method may further include receiving, from the UE, an uplink signal with an uplink transmission power level determined based on the uplink power adjustment value when the second indicator indicates that the power control for the purpose of reducing the order to be considered as the nonlinear components of the self-interference signal is accepted. The first indicator may be transmitted through a physical downlink control channel (PDCCH).

According to another aspect of the present invention, a method of receiving a power control factor by a UE from a device performing SIC in a wireless communication system using FDR scheme includes: receiving, from the device, a first indicator indicating power control for purpose of reducing an order to be considered as nonlinear components a self-interference signal; and transmitting, to the device, a second indicator indicating whether the power control for the purpose of reducing the order to be considered as the nonlinear components of the self-interference signal is accepted or not in response to the first indicator.

The method may further include receiving, from the device, an uplink power adjustment value to be applied to an uplink transmission of the UE according to the power control for the purpose of reducing the order to be considered as the nonlinear components. The method may further includes determining an uplink transmission power level based on the uplink power adjustment value and transmitting an uplink signal to the device at the determined uplink transmission power level when the second indicator indicates that the power control for the purpose of reducing the order to be considered as the nonlinear components of the self-interference signal is accepted.

According to another aspect of the present invention, a device performing self-interference cancellation (SIC) for transmitting a power control factor in a wireless communication system using FDR scheme includes: a transmitter configured to transmit, to a user equipment (UE), a first indicator indicating a power control for purpose of reducing an order to be considered as nonlinear components of a self-interference signal; and a receiver configured to receive, from the UE, a second indicator indicating whether the power control for the purpose of reducing the order to be considered as the nonlinear components of the self-interference signal is accepted or not in a response to the first indicator. The transmitter may be configured to transmit an uplink power adjustment value to be applied to an uplink transmission of the UE according to the power control for the purpose of reducing the order to be considered as the nonlinear components. The receiver may receive an uplink signal from the UE with an uplink transmission power level determined based on the uplink power adjustment value when the second indicator indicates that the power control for the purpose of reducing the order to be considered as the nonlinear components of the self-interference signal is accepted.

According to another aspect of the present invention, a user equipment (UE) for receiving a power control factor from a device performing self-interference cancellation (SIC) in a wireless communication system using full duplex radio (FDR) scheme includes: a receiver configured to receive, from a device, a first indicator indicating a power control for purpose of reducing an order to be considered as nonlinear components of a self-interference signal; and a transmitter configured to transmit, to the device, a second indicator indicating whether the power control for the purpose of reducing the order to be considered as the nonlinear components of the self-interference signal is accepted or not in response to the first indicator. The receiver may receive an uplink power adjustment value to be applied to an uplink transmission of the UE according to the power control for the purpose of reducing the order to be considered as the nonlinear components. The UE may further include a processor configured to determine an uplink transmission power level based on the uplink power adjustment value, wherein the transmitter is further configured to transmit, to the device, an uplink signal at the determined uplink transmission power level when the second indicator indicates that the power control for the purpose of reducing the order to be considered as the nonlinear components of the self-interference signal is accepted.

According to an embodiment of the present invention, a device that performs SIC may perform power control procedures for reducing a nonlinear component order in an FDR situation for a companion node, thereby preventing overhead caused by complicated SIC.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
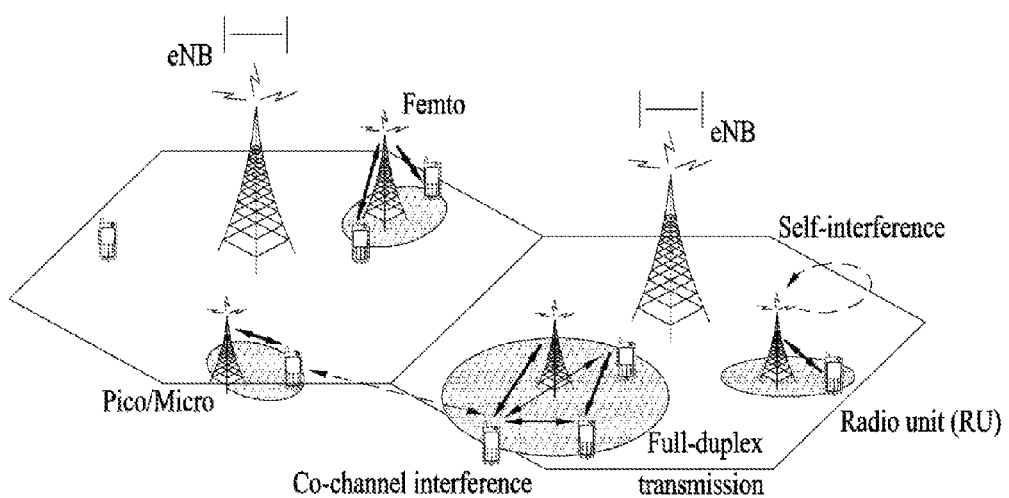
FIG. 1 illustrates a network supporting full-duplex/half-duplex communication of a UE provided by the present invention.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE system or 3GPP LTE-A system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including code division multiple access (CDMA), frequency division multiple access (FDMA), time division multiple access (TDMA), orthogonal frequency division multiple access (OFDMA), single carrier frequency division multiple access (SC-FDMA) and the like. CDMA can be implemented by such a radio technology as universal terrestrial radio access (UTRA), CDMA 2000 and the like. TDMA can be implemented with such a radio technology as global system for mobile communications/general packet radio service/enhanced data rates for GSM evolution (GSM/GPRS/EDGE). OFDMA can be implemented with such a radio technology as IEEE 802.11 (Wi-Fi), IEEE 802.16

(WiMAX), IEEE 802.20, E-UTRA (Evolved UTRA), etc. UTRA is a part of universal mobile telecommunications system (UMTS). 3rd generation partnership project (3GPP) long term evolution (LTE) is a part of evolved UMTS (E-UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
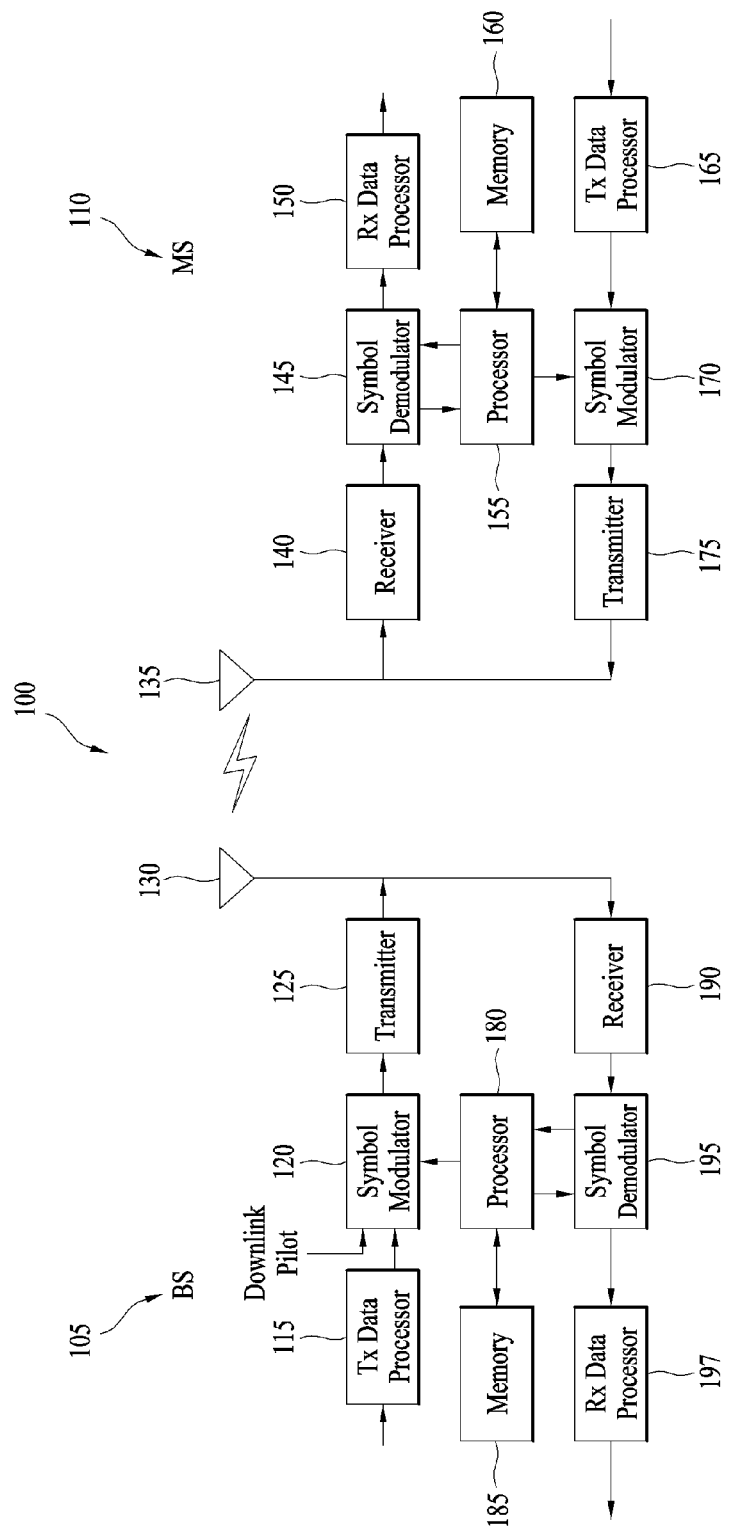
FIG. 2 is a block diagram illustrating configurations of an eNB 105 and a UE 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Prior to description of a power control method considering SIC in an FDR environment according to the present invention, three SIC methods will now be briefly described.

Antenna SIC: Antenna SIC needs to be preferentially performed from among all SIC methods. SIC is performed in an antenna stage. In a simplest way, part of an SI signal can be cancelled by installing an object capable of blocking signals between transmission and reception antennas to physically block SI signal transfer, artificially controlling a distance between antennas using multiple antennas or inversing the phase of a specific transmitted signal. In addition, part of an SI signal can be cancelled using a multi-polarized antenna or a directional antenna.

Analog SIC: Analog SIC is a method of cancelling interference in an analog stage before a received signal passes through an analog-to-digital converter and cancels an SI signal using a duplicated analog signal. This can be performed in an RF region or an IF region. SIC is performed as follows. A transmitted analog signal is delayed and then the magnitude and phase thereof are controlled to generate a duplicated signal of an actually received SI signal, and the duplicated signal is subtracted from a signal received through a reception antenna. However, additional distortion may be generated due to implementation complexity and circuit characteristics since SI is processed using an analog signal, and thus interference cancellation performance may remarkably vary.

Digital SIC: Digital SIC is a method of cancelling interference after a received signal passes through an ADC and includes all interference cancellations performed in a baseband. In a simplest way, a duplicated signal of SI may be generated using a transmitted digital signal and subtracted from a received digital signal. Methods of performing precoding/postcoding in a baseband using multiple antennas such that a signal transmitted to a UE or an eNB is not received through a reception antenna can be classified as digital SIC. However, since digital SIC can be performed only when a modulated digital signal is quantized such that information about a desired signal can be restored, there is a need for a precondition that a magnitude difference between an interference signal remaining after interference cancellation using one or more of the aforementioned methods and a desired signal should be within an ADC range in order to perform digital SIC.

SI is generated only in FDR and is a problem that needs to be solved first to operate FDR. For FDR operation, SIC is proposed and is performed in such a manner that a magnitude difference between a power level used to transmit a signal from a transmission (Tx) antenna and background noise present at a reception antenna is corrected.

Figure 3:
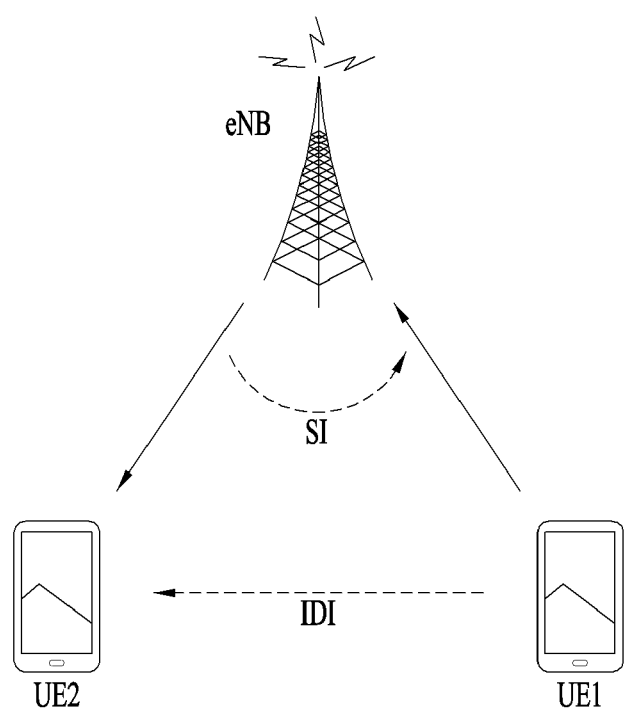
FIG. 3 illustrates the concept of SI and IDI generated when an eNB uses an FD mode (simultaneous transmission/reception mode using the same frequency) in the same resource.

Intra-device interference (referred to hereinafter as SI) and inter-device interference (IDI) are generated only in the FDR system since the same resource is used in a cell. FIG. 3 illustrates the concept of SI and IDI generated when an eNB uses the FD mode (simultaneous transmission/reception mode using the same frequency) in the same resource.

FIG. 3 illustrates an example of generation of SI in an eNB and generation of IDI between UEs for facilitation of description, and an SI or IDI generation subject, the number of UEs and an operation mode (FD mode or HD mode) are not limited in the present invention. In a communication system using full duplex, frequency division duplex (FDD) or time division duple (TDD) is used, that is, transmission resources are discriminated from reception resources, and thus SI and IDI are not generated. While interference of a neighbor cell in conventional communication systems is effective even in the FDR system, this is not described in the present invention.

For transmission with power necessary to support a predetermined data transfer rate in a mobile communication system, power control is essential. Excessively high power may cause unnecessary interference, whereas excessively low power requires increase of retransmission through an increase of data transmission error, causing larger transmission delay and lower throughput. When an eNB increases Tx power of a wireless UE located at a cell boundary to allow higher Tx power for distant wireless UEs than that for close wireless UEs in order to secure quality, Tx power increase acts as interference on a neighbor cell and thus Tx power needs to be minimized. This is called (dynamic) power control. Dynamic power control dynamically controls Tx power of a radio link in order to compensate for an instantaneous channel state variation and difference. The purpose of such power control is to maintain the energy per bit-to-noise power spectral density ratio (Eb/No) in a receiver in order to successfully transmit data without generating many errors. In principle, power control is performed in such a manner that transmitter power is increased when a radio link state is not good and decreased when the radio link state is good. This represents that a uniform data rate can be obtained in spite of channel variation.

Power control technology may be divided into uplink (UL) power control and downlink (DL) power control, and UL power control is classified into open loop power control and closed loop power control. UL power control refers to UE Tx power control and is technology for maintaining high communication quality and maximizing capacity for all UEs. UE Tx power is controlled such that reception (Rx) powers from UEs, received at an eNB, become identical to achieve a minimum signal-to-noise ratio. A power control method in 3GPP LTE/LTE-A, an exemplary mobile communication system, is included in TS 36.213 document, and major expressions and concept with respect to UL power control are shown in Table 1.

TABLE 1

- Uplink power control scheme
  - Power control for PUSCH
  $P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\}$ [dBm]

TABLE 1-continued

■ Power control for PUCCH
$P_{PUCCH}(i) = \min\{P_{CMAX}, P_{0\_PUCCH} + PL + h(n_{CQI}, n_{HARQ}) + \Delta_{F\_PUCCH}(F) + g(i)\}$ [dBm]
■ Power control for SRS (Sounding Reference Signal)
$P_{SRS}(i) = \min\{P_{CMAX}, P_{SRS\_OFFSET} + 10\log_{10}(M_{SRS}) + P_{O\_PUSCH}(j) + \alpha(j) \cdot PL + f(i)\}$ [dBm]

Downlink Power Control Scheme

A downlink power control method in 3GPP LTE/LTE-A is described in Table 2.

TABLE 2

The eNodeB determines the downlink transmit energy per resource element.
A UE may assume that downlink cell-specific RS EPRE is constant across the downlink system bandwidth and constant across all subframes until different cell-specific RS power information is received. The downlink reference-signal EPRE can be derived from the downlink reference-signal transmit power given by the parameter Reference-signal-power provided by higher layers. The downlink reference-signal transmit power is defined as the linear average over the power contributions (in [W]) of all resource elements that carry cell-specific reference signals within the operating system bandwidth.
The ratio of PDSCH EPRE to cell-specific RS EPRE among PDSCH REs (not applicable to PDSCH REs with zero EPRE) for each OFDM symbol is denoted by either $\rho_A$ or $\rho_B$ according to the OFDM symbol index as given by Table 5.2-2. In addition, $\rho_A$ and $\rho_B$ are UE-specific.

Major expressions and concept with respect to UL/DL power control methods in an FDR system in which SI and IDI coexist are as follows. From among power control methods in LTE/LTE-A, a UL power control method may be represented by Equation 4 and a DL power control method may be represented by Equation 5.

Power allocation (P)=min{UE maximum Tx power,
g (power control factor)}  [Equation 4]

Equation 4 represents that power is controlled such that power derived by a power control factor g, such as DL pathloss, applied format, modulation mode, etc., does not exceed maximum Tx power per carrier. Maximum UE Tx power is represented by $P_{CMAX}$.

Power allocation (P)=min {RS maximum Tx power,
g (power control factor)}  [Equation 5]

Equation 5 represents a method of determining power of signals other than an RS in order to adjust total Tx power uniformly on the basis of the RS.

Equation 6 represents a UL power control method in the FDR system.

Power allocation (P)=min{UE maximum Tx power,
max{min{$P_R(P_T(g$(existing power control factor)+$\Delta f(SI)$)), β},α}}  [Equation 6]

Here, f(SI) indicates Tx power of an aggressor (i.e. a UE that causes IDD that can perform SIC, $P_T$(g(existing power control factor)+Δf(SI)) represents controlling power such that the magnitude of an uplink signal received by an eNB from a UE is greater than a remaining SI signal, and α and β represent that IDI received by a victim UE (i.e. a UE to which IDI is applied) needs to be limited within an allowable range (α-β).

Equation 7 represents a DL power control method in the FDR system.

RS power allocation (P)=min{RS maximum Tx
power, min{PT(g(existing power control factor),
f(SI))}}  [Equation 7]

Equation 7 represents a method of setting a lower power limit such that lowest power is greater than remaining SI and then controlling RS Tx power and setting a lower limit in consideration of ACK/NACK and UL power in a victim. In the present invention, a remaining SI signal refers to an SI signal remaining after a device (or UE) performs SIC.

Non-linear SIC is performed in consideration of Tx power of a device that performs SIC, for example, the eNB in FIG. 3. As Tx power increases, a higher order component (=non-linear component) of a self-interference channel needs to be considered, and a low-complexity channel estimation and reference signal design scheme in such situation is needed.

Previously, the values Δf(SI) and f(SI) included in Equations 6 and 7 in a situation in which an SIC target value arrives at a noise floor (e.g. −96 dBm to −92 dBm in the case of bandwidth of 20 MHz) were transmitted. Here, for noise floor arrival, only a high order nonlinear component was considered and the accurate order thereof was not considered. When a higher order nonlinear component is considered, complexity may increase and channel estimation performance may be deteriorated, and thus it may be important to set an appropriate order. However, for channel estimation considering a nonlinear component, an additional reference signal is needed, increasing overhead.

The present invention describes a method of setting an estimated nonlinear component order in consideration of the magnitude of a signal (signal transmitted by UE1 in FIG. 3) received by a device that performs SIC and transmitting a signal with respect to the estimated nonlinear component order. SIC shows the most optimal performance for a desired received signal, for example, the signal transmitted from UE1 to the eNB on UL in FIG. 3, when remaining SI is reduced to a noise floor power level. However, if the level of the desired received signal is higher than noise, target decoding performance may not be affected. This represents that the level of the remaining SI signal may not be reduced to the noise floor power level if only an SNR that satisfies a target block error rate (BLER) can be maintained. To reduce the remaining SI signal to the noise floor power level, a device that performs SIC needs to consider even a high order nonlinear component, in general. Since estimation complexity increases as an order increases, a relatively low nonlinear component order may be considered in order to reduce estimation complexity.

Figure 4:
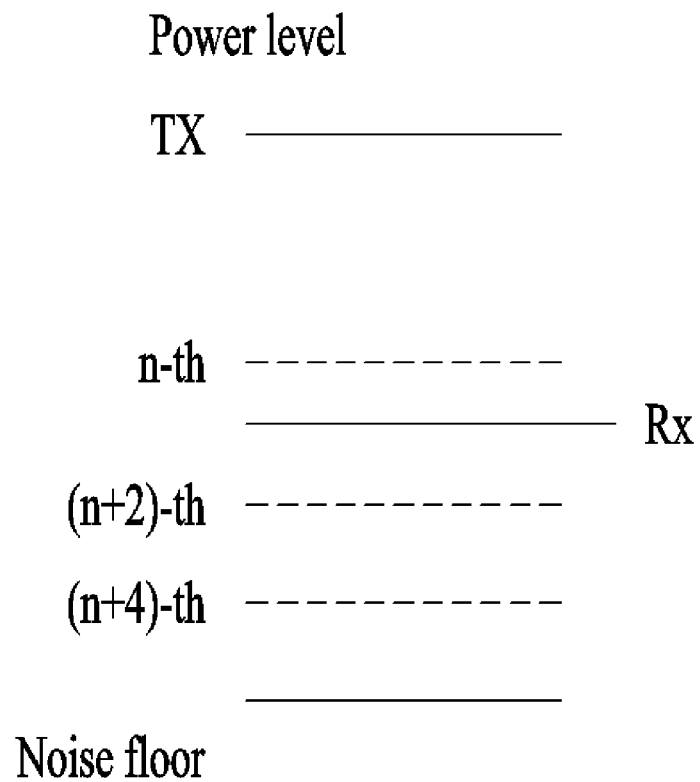
FIG. 4 illustrates a power level with respect to each signal in a device that performs SIC.

FIG. 4 illustrates a power level with respect to each signal in a device that performs SIC.

In FIG. 4, (n+k)-th represents the magnitude of an SI signal remaining after SIC even when an (n+k) order of a nonlinear component is considered. Here, it is assumed that performance deterioration due to over-estimation is not present. That is, when k<m, (n+k)-th is lower than (n+m)-th. To prevent deterioration of performance of decoding a desired received signal, that is, an Rx signal, k may be set such that a difference between the Rx signal and (n+k)-th with respect to an Rx power level exceeds a predetermined level. Here, k may be determined on the basis of an SNR that satisfies a target BLER.

In the present invention, an eNB may instruct Tx power of a UL signal of a UE to be changed for desired received signal decoding performance even when an additional reference signal for nonlinear component estimation cannot be used. The order of a nonlinear component, which needs to be considered when SIC capable of arriving at a noise floor power level is used, may be represented according to DL signal Tx power Pt. Since the nonlinear component needs to be considered in the case of DL signal Tx power of Pt or higher, the nonlinear component needs to be considered in the case of 10 dBm or higher, for example and, when Pt is 13 dBm, a third component needs to be considered. In the present invention, however, an eNB can transmit a UL Tx power control signal to a UE such that SIC performance reaches a (noise floor+3 dBm) power level instead of the noise floor power level and Rx power at the eNB is increased by 3 dB. Here, the eNB may not use an additional reference signal since decoding of a desired signal for Tx power of 13 dBm can be performed even if only interference cancellation performance corresponding to Tx power of 10 dBm, that is, a linear component from a viewpoint of SIC is considered.

The method of maintaining UL signal performance has been described. The advantage of reducing a nonlinear component order in an eNB is achieved, whereas the disadvantage of UE uplink power increase is generated. Accordingly, whether to use the method may be determined according to whether UE Tx power can be increased. The following two embodiments can be considered in this case.

Embodiment 1

As an explicit method, an eNB may indicate that power control is performed for the purpose of reducing a nonlinear component order in an FDR situation through an indicator (e.g., a 1-bit indicator). The eNB may transmit the indicator to a UE over a physical channel such as a physical downlink control channel (PDCCH). Here, the indicator may be transmitted in a downlink control information (DCI) format in the PDCCH. For example, the indicator can be transmitted through a field newly defined in a DCI format for FDR communication.

Upon reception of the indicator, the UE may transmit an indicator (e.g. a 1-bit indicator) indicating whether power control is accepted or impossible in consideration of remaining power of the UE to the eNB as feedback information. The indicator may be transmitted from the UE to the eNB as uplink control information (UCI) over a physical channel such as a physical uplink control channel (PUCCH) or a physical uplink shared channel (PUSCH).

When the indicator transmitted by the UE indicates that power control for the purpose of reducing the nonlinear component order in the FDR situation is accepted, the eNB may transmit, to the UE over a PDCCH, an uplink power control value (e.g. $\Delta f(SI)$ in Equation 6), which will be applied to uplink transmission of the UE according to power control for the purpose of reducing the nonlinear component order in the FDR situation. Of course, the eNB may transmit, to the UE over a PDCCH, the uplink power control value (e.g. $\Delta f(SI)$ in Equation 6), which will be applied to uplink transmission of the UE according to power control for the purpose of reducing the nonlinear component order in the FDR situation, along with or separately from the indicator to be sent to the UE irrespective of the contents of the indicator transmitted by the UE.

When the UE accepts the power control instruction received from the eNB, the UE may determine a Tx power level of a PUSCH and a PUCCH using the uplink power control value (e.g. $\Delta f(SI)$ in Equation 6) to be applied to uplink transmission, received from the eNB, and transmit the PUSCH and PUCCH with the determined power level.

When the eNB does not receive the indicator from the UE, the eNB maintains the nonlinear component order that needs to be considered in SIC.

Embodiment 2

The eNB may simultaneously transmit power control information considering up to noise floor power level SIC and power control information considering up to (n+k)-th SIC. Here, the power control information may be transmitted through a PDCCH. For example, the power control information (e.g. a power control value) considering up to noise floor power level SIC may be related to power control considering a distance, as represented by Equations 6 and 7, and may be transmitted simultaneously with relative control information (e.g. a relative power control value) considering up to (n+k)-th SIC.

In this case, the UE may transmit, to the eNB, feedback information including an indicator (e.g. 1-bit indicator) that indicates whether power control is accepted or power control is impossible in consideration of remaining power thereof. Here, the feedback information may be transmitted through a physical channel such as a PUSCH and a PUCCH. In addition, the UE may feed back, to the eNB, information indicating which one of the power control information considering up to noise floor power level SIC and the relative control information considering up to (n+k)-th SIC, received from the eNB, has been used. If the eNB does not receive the indicator from the UE, the eNB maintains a nonlinear order that needs to be considered in SIC.

When successive interference cancellation for enhancing downlink decoding performance of UE2 in FIG. 3 is used, an estimated nonlinear component order may be reduced in order to decrease SIC complexity in the eNB. Since interference cancellation performance is improved as interference intensity increases in successive interference cancellation, the eNB may instruct UE1 to increase Tx power for a UL signal in order to improve decoding performance of UE2. Accordingly, the eNB can consider the (n+m)-th order instead of (n+k)-th order (k>m) since Rx signal intensity increases compared to SIC performance.

According to the aforementioned embodiment of the present invention, a device that performs SIC may execute power control procedures for the purpose of reducing a nonlinear component order in an FDR situation, for a companion node, thereby preventing overhead caused by complicated SIC.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that the present invention can be embodied in other specific forms without departing from essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The method of transmitting a power control factor by a device performing SIC in a wireless communication system using FDR and the devices therefor according to the present invention are industrially applicable to various wireless communication systems such as 3GPP LTE/LTE-A systems.

What is claimed is:

1. A method of transmitting a power control factor by a device performing self-interference cancellation (SIC) in a wireless communication system using a full-duplex radio (FDR) scheme, the method comprising:
    transmitting, to a user equipment (UE), a first indicator indicating a power control for reducing an order to be considered as nonlinear components of a self-interference signal; and
    receiving, from the UE, a second indicator indicating whether the power control is accepted; and
    when the second indicator indicates that the power control is accepted, transmitting an uplink power adjustment value to the UE to be applied to an uplink transmission of the UE according to the power control and receiving an uplink signal from the UE with an uplink transmission power level determined based on the uplink power adjustment value.

2. The method according to claim 1, wherein the uplink power adjustment value indicates that the UE needs to increases an uplink transmission power value.

3. The method according to claim 1, wherein the first indicator is transmitted through a physical downlink control channel (PDCCH).

4. A method of receiving a power control factor by a user equipment (UE) from a device performing self-interference cancellation (SIC) in a wireless communication system using a full duplex radio (FDR) scheme, the user equipment comprising:
    receiving, from the device, a first indicator indicating a power control for reducing an order to be considered as nonlinear components of a self-interference signal;
    transmitting, to the device, a second indicator indicating whether the power control is accepted; and
    when the second indicator indicates that the power control is accepted, receiving an uplink power adjustment value from the device to be applied to an uplink transmission of the UE according to the power control, determining an uplink transmission power level based on the uplink power adjustment value and transmitting an uplink signal to the device based on the determined uplink transmission power level.

5. The method according to claim 4, wherein the uplink power adjustment value indicates that the UE needs to increases an uplink transmission power value.

6. The method according to claim 4, wherein the first indicator is received through a physical downlink control channel (PDCCH).

7. A device performing self-interference cancellation (SIC) for transmitting a power control factor in a wireless communication system using full duplex radio (FDR) scheme, the device comprising:
    a transmitter configured to transmit, to a user equipment (UE), a first indicator indicating a power control reducing an order to be considered as nonlinear components of a self-interference signal; and
    a receiver configured to receive, from the UE, a second indicator indicating whether the power control is accepted,
    wherein the transmitter is further configured to transmit an uplink power adjustment value to the UE to be applied to an uplink transmission of the UE according to the power control when the second indicator indicates that the power control is accepted; and
    wherein the receiver is further configured to receive an uplink signal from the UE with an uplink transmission power level determined based on the uplink power adjustment value.

8. The device according to claim 7, wherein the device comprises a base station.

9. The device according to claim 7, wherein the uplink power adjustment value indicates that the UE needs to increases an uplink transmission power value.

10. The device according to claim 7, wherein the first indicator is received through a physical downlink control channel (PDCCH).

11. A user equipment (UE) for receiving a power control factor from a device performing self-interference cancellation (SIC) in a wireless communication system using a full duplex radio (FDR) scheme, the UE comprising:
    a receiver configured to receive, from a device, a first indicator indicating a power control for reducing an order to be considered as nonlinear components of a self-interference signal;
    a transmitter configured to transmit, to the device, a second indicator indicating whether the power control is accepted; and
    a processor configured to:
    control the receiver to receive, from the device, an uplink power adjustment value from the device to be applied to an uplink transmission of the UE according to the power control when the second indicator indicates that the power control is accepted;
    determine an uplink transmission power level based on the uplink power adjustment value, and
    control the transmitter to transmit an uplink signal to the device based on the determined uplink transmission power level.

12. The UE according to claim 11, wherein the uplink power adjustment value indicates that the UE needs to increases an uplink transmission power value.

13. The UE according to claim 11, wherein the first indicator is received through a physical downlink control channel (PDCCH).

* * * * *